Dec. 25, 1923.　　　　　　　　　　　　　　　　1,478,556
J. DAIN
HAY LOADER
Filed Oct. 29, 1919　　　5 Sheets-Sheet 2

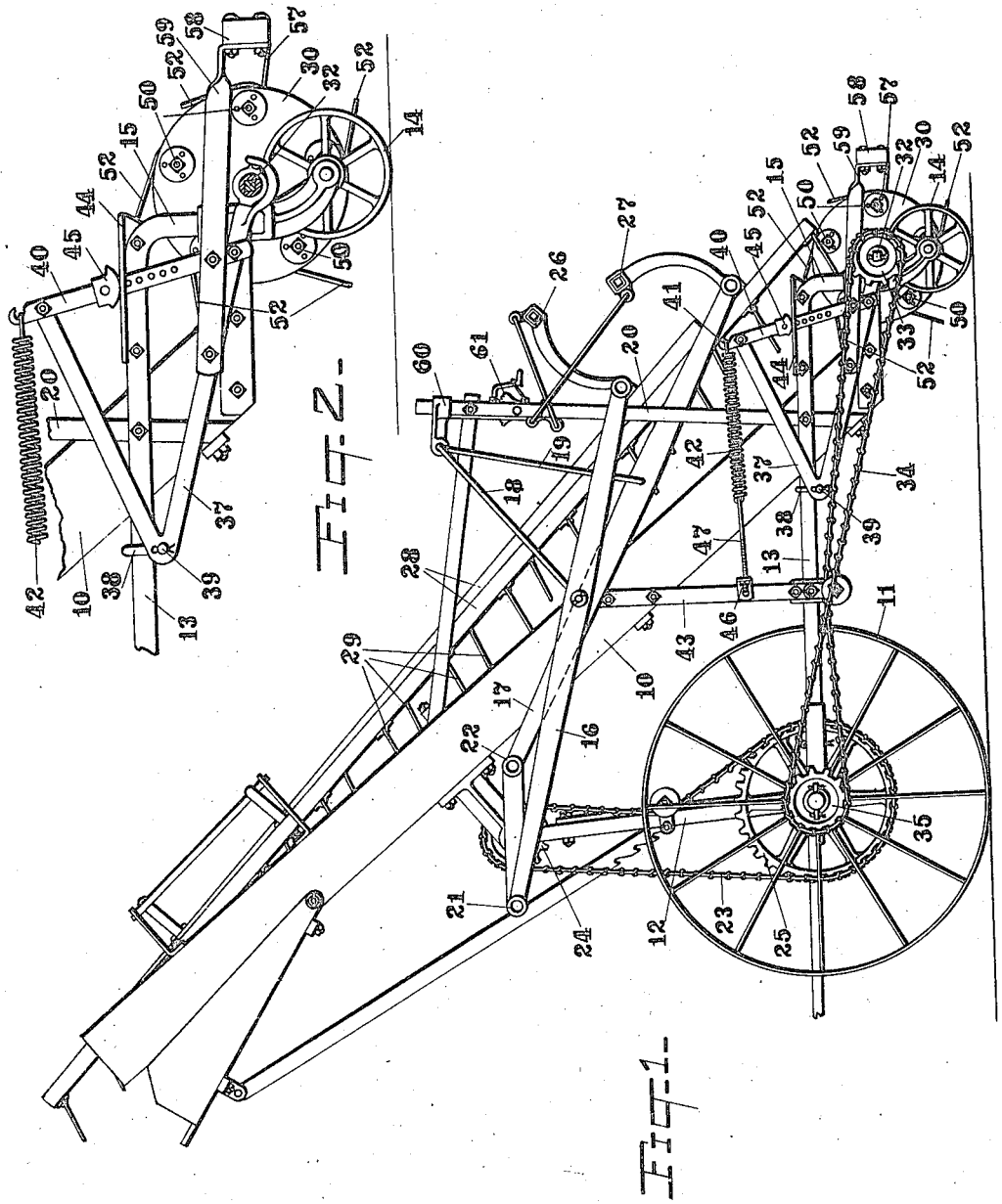

Dec. 25, 1923.
1,478,556
J. DAIN
HAY LOADER
Filed Oct. 29, 1919      5 Sheets-Sheet 3
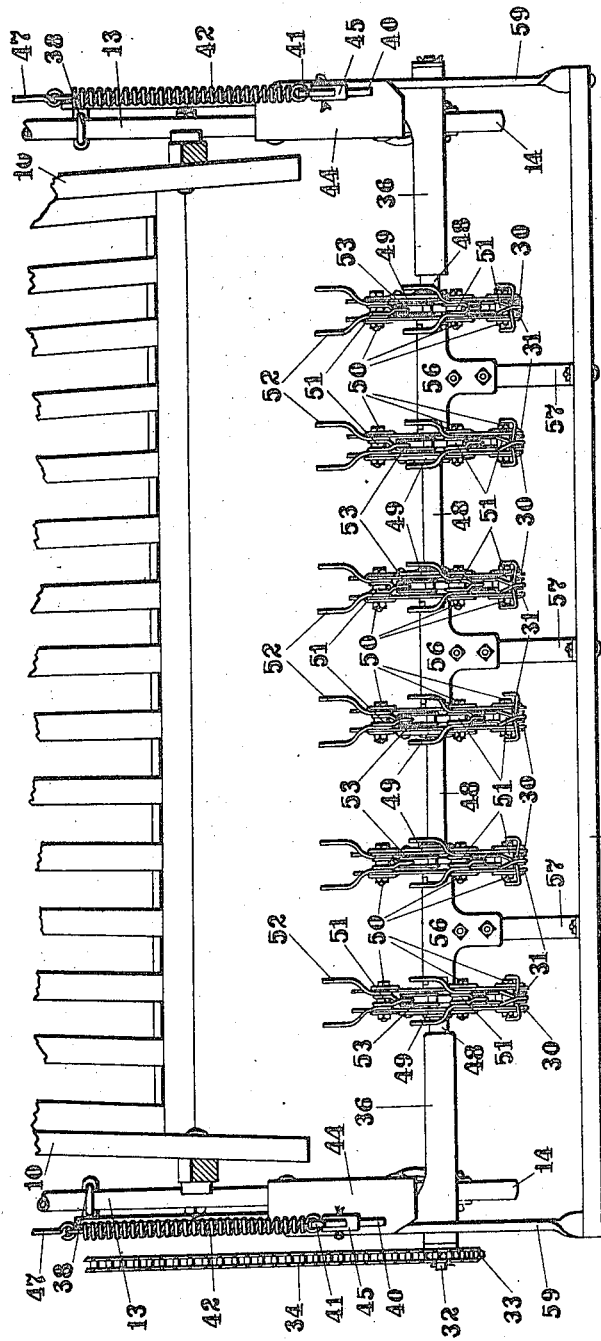
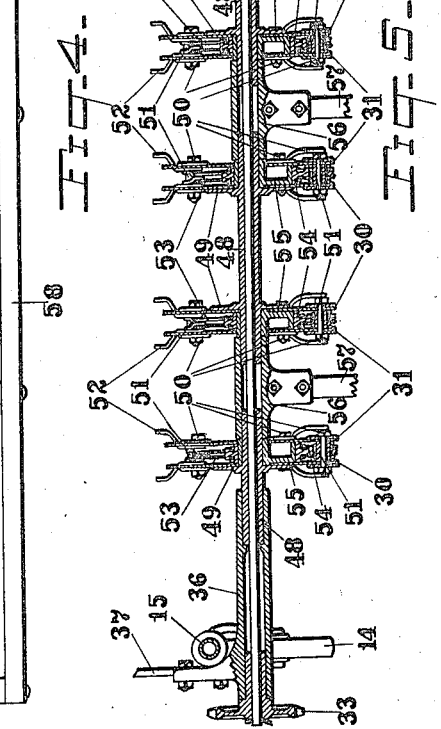

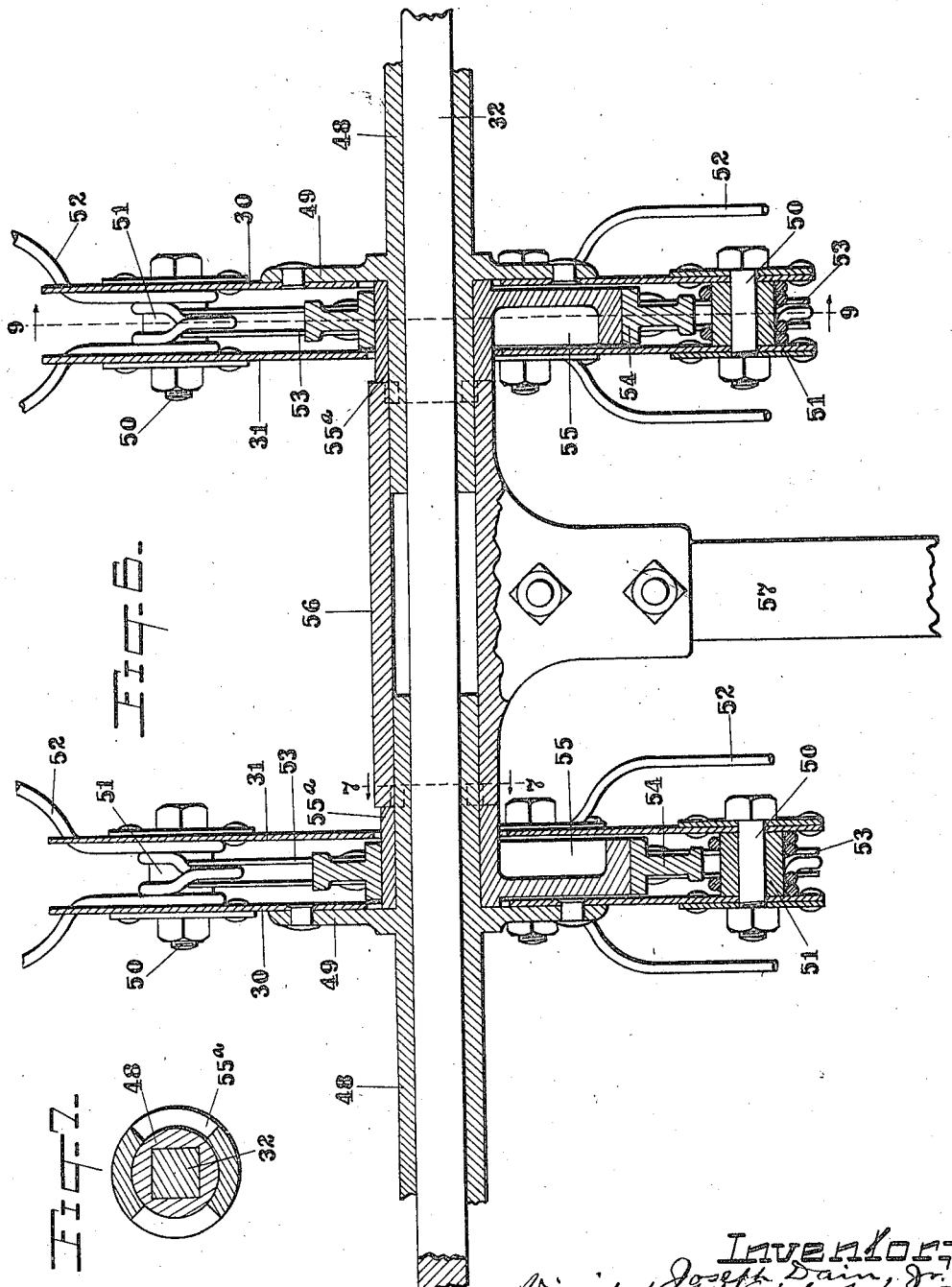

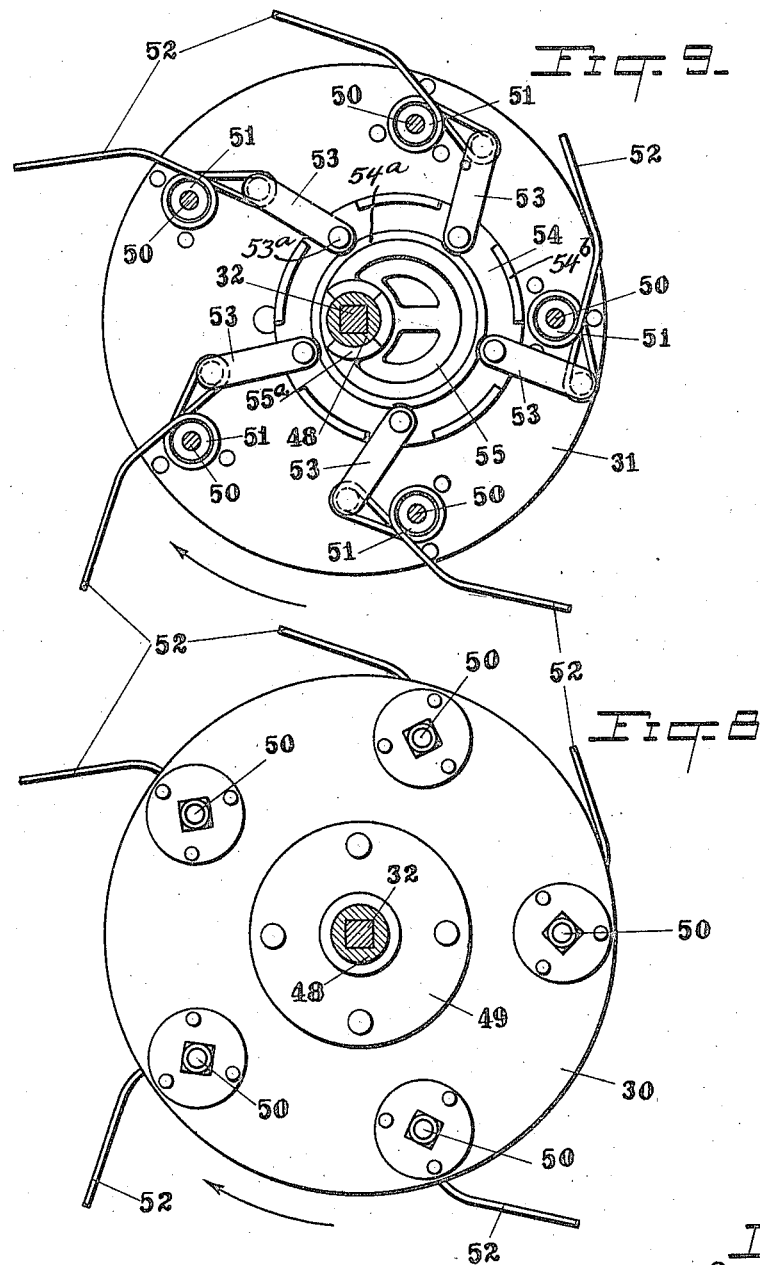

Patented Dec. 25, 1923.

1,478,556

UNITED STATES PATENT OFFICE.

JOSEPH DAIN, DECEASED, BY JOSEPH DAIN, JR., ADMINISTRATOR, OF MOLINE, ILLINOIS, ASSIGNOR TO THE DAIN MANUFACTURING COMPANY OF IOWA, OF OTTUMWA, IOWA, A CORPORATION OF IOWA.

HAY LOADER.

Application filed October 29, 1919. Serial No. 334,340.

*To all whom it may concern:*

Be it known that I, JOSEPH DAIN, Jr., a citizen of the United States, residing at Moline, in the county of Rock Island and State of Illinois, administrator of the estate of Joseph Dain, deceased, hereby declare that the said Joseph Dain did invent certain new and useful Improvements in Hay Loaders, of which the following is a specification, reference being had to the accompanying drawings.

This invention relates to hay loaders of the general type shown and described in Letters Patent No. 961,757, granted June 21, 1910, to Joseph Dain, in which the hay is carried up over an inclined elevator frame by means of rake frames reciprocated thereover by reciprocating rocking levers actuated from the carrying wheels of the loader by means of cranks located under the elevator frame. It should be understood, however, that so far as the present invention is concerned, the specific location and arrangement of the mechanism for reciprocating the rake frames is not material as any suitable means for the purpose may be employed.

The object of this invention is to provide improved means co-operating with the rake frames for raking up the hay from the ground and delivering it to the rake frames, instead of relying upon the rake frames to do the picking up of the hay from the ground. This object is accomplished as illustrated in the accompanying drawings and as hereinafter described. What is regarded as new is set forth in the claims.

In the drawings

Fig. 1 is a side elevation.

Fig. 2 is an enlarged detail illustrating the construction employed for connecting the raking devices to the loader frame.

Fig. 4 is a plan view of the raking devices and the lower or rear portion of the elevator frame, some parts being in section.

Fig. 5 is a longitudinal sectional view of the raking devices.

Fig. 6 is a fragmentary enlarged sectional view of the same.

Fig. 7 is a cross-section on line 7—7 of Fig. 6.

Fig. 8 is a side elevation of one of the rotary rake members, and

Fig. 9 is a section on line 9—9 of Fig. 6 showing the mechanism for controlling the angular position of the raking teeth.

Figure 3:
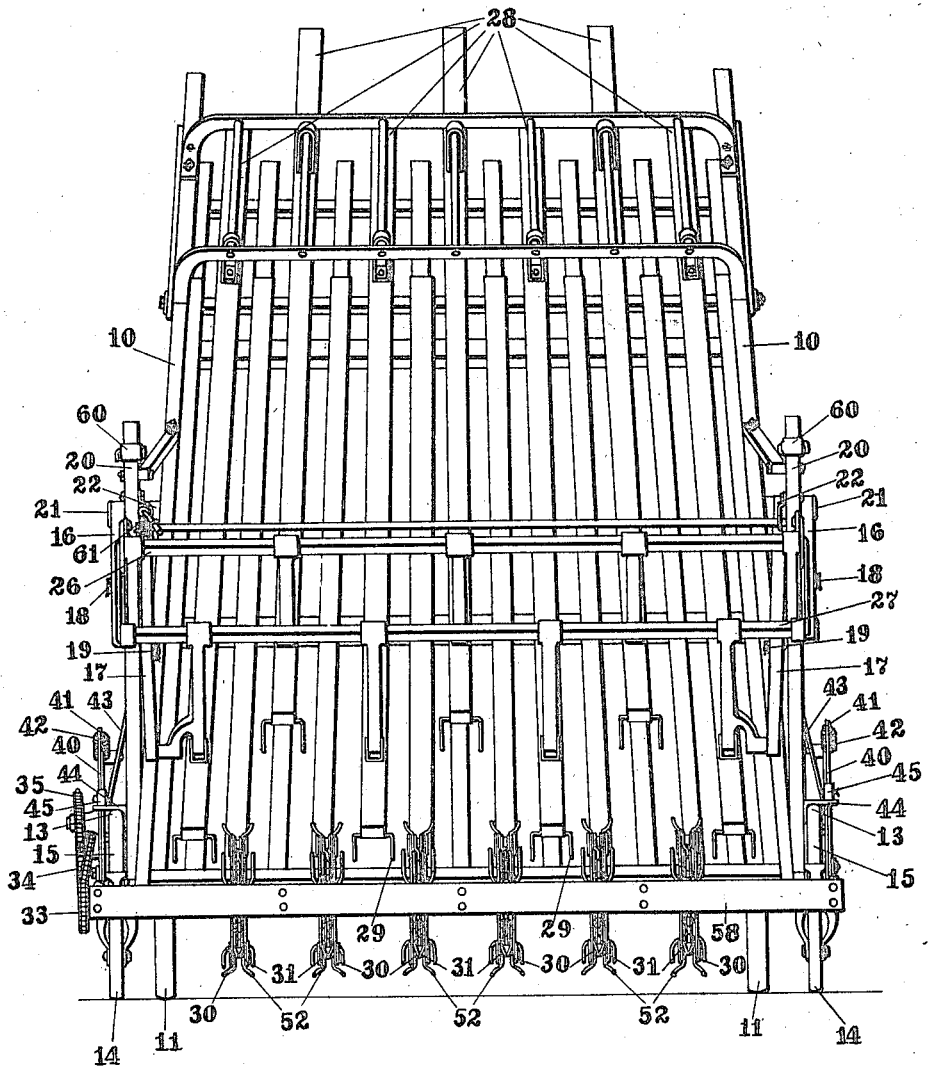
Fig. 3 is a rear elevation.

Referring to the drawings,—10 indicates the elevator frame, which is pivotally supported upon carrying wheels 11 by means of a frame composed of an upright member 12 and horizontal members 13, which together compose what may be termed the machine frame. This machine frame, and with it the elevator frame, may rock about the axis of the carrying wheels, and it is supported at the rear by caster wheels 14 fitted upon downturned extensions 15 of the members 13, which are preferably circular in cross-section.

16, 17 indicate reciprocating rocking levers or pitmen at the sides of the elevator frame, which are fulcrumed upon swinging links 18, 19 depending from uprights 20 secured to the side members of the elevator frame, as shown in Fig. 1. The forward ends of these pitmen are connected with cranks 21, 22 mounted on the upright member 12 and rotated by link belts 23 running over sprocket wheels 24, 25, the latter being connected to rotate with the carrying wheels 11 when the loader is advancing, as is well understood. The rear ends of the pitmen 16, 17 are connected with rake frames 26, 27, composed of rake bars 28 having rake teeth 29. The arrangement is such that the rake frames 26, 27 alternately move up over and in close proximity to the elevator frame, and return at a distance therefrom, as fully set forth in said Dain patent.

The feature which characterizes the present invention is the provision of rotary raking devices which co-operate with the rake frames by picking up the hay and delivering it to the rake teeth at the lower ends of the rake bars thereof. These raking devices comprise a plurality of pairs of discs 30, 31 mounted to rotate about a common axis and arranged at intervals across the rear end of the loader adjacent to the lower end of the elevator frame, as shown in Fig. 1. This is accomplished by providing a shaft 32 which extends transversely of the machine and carries a sprocket wheel 33 driven by a crossed link belt 34 from a sprocket wheel 35 connected with one of the carrying wheels 11, as shown in Fig. 1. This shaft is mounted in bearing sleeves 36 carried by the lower members of V-shaped brackets 37, the apices of which are connected to the members 13 by clips 38 having laterally extending pivots 39 on which said brackets are mounted, as shown in Figs. 1 and 2. The divergent arms of the brackets 37 are connected by bars 40 which are provided with hooks 41 at their upper ends for the attachment of springs 42, as shown in Fig. 1. The opposite ends of said springs are connected to the machine frame by upright bars 43, so that they operate to exert forward pull upon the upper ends of the bars 40. The latter bars extend through longitudinal slots in laterally extending plates 44 secured to the frame members 13, and are provided with rocker bearings in the form of bearing blocks 45 adjustably secured upon them which bear upon the plates 44, as best shown in Fig. 2. Thus an adjustable floating support is provided for the shaft 32 and the discs mounted on it as hereinafter described, as the bearing blocks or rockers 45 bear on the plates 44 at one side of the pivots 39 about which the brackets 37 swing, and limit the downward movement of the shaft 32 without interfering with its upward movement. The springs 42 cushion the shaft and prevent shock when it descends after having been lifted, and counterbalance to a greater or less extent the weight of said shaft and the parts carried by it. The tension of the springs 42 may be adjusted, as by a nut 46 screwed on a connecting rod 47, shown in Fig. 1, and the bearing blocks may be adjusted on the bars 40 by means of pin holes provided for that purpose, as shown.

The rake discs 30 are mounted on the shaft 32 to rotate therewith by means of sleeves 48 non-rotatably fitted on said shaft, as shown in Fig. 6. Preferably the shaft is made square in cross-section for this purpose, as shown in Fig. 7. Each of the sleeves 48 is provided intermediately with a flange 49, as shown in Fig. 6, and the disc 30 is bolted or riveted to said flange. The discs 31 are not connected directly to the sleeves 48, but are connected to the discs 30 by cross bolts 50 and spacing sleeves 51, as shown at the bottom of Fig. 6, so that the discs of each pair are fixedly connected together and held properly spaced apart.

52 indicates rake teeth, preferably made of looped wire, which are pivotally mounted on the spacing sleeves 51, as shown in Figs. 6 and 9, so that they are adapted to be turned to different angular positions with relation to the peripheries of their respective discs. The looped ends of the teeth of each pair of discs are connected by links 53 with wrist pins 53$^a$ carried by an eccentric ring 54 which is fitted upon an eccentric 55 loosely mounted on the sleeve 48 between the discs of each pair, as shown in Fig. 6 and held against rotation by means which will presently be described. Preferably the eccentric ring 54 is provided at its inner margin with an annular flange 54$^a$ and at its outer margin with lugs 54$^b$ at opposite sides of the links 53. Said lugs serve as abutments arranged to coact with said links to control the angle of the sets of teeth as the rake rotates and also to cause the ring 42 to rotate about the eccentric 55. Thus by the rotation of the discs 30, 31 the eccentric ring 54 will be caused to rotate on the fixed eccentric 55, with the result that the rake teeth will be rocked to cause them to assume the different angular positions shown in Figs. 8 and 9 as they revolve about the shaft 32. The several pairs of discs are so positioned with reference to the rake frames that the lower ends of the raker bars extend between the pairs of discs when said raker bars approach the limit of their downward stroke, as shown in Fig. 1, and consequently the paths of the lower raker bar teeth and the teeth of the discs overlap. The discs rotate in a clock-wise direction as viewed in Fig. 1, and the eccentric mechanism which controls the position of the disc teeth is arranged to operate so that said teeth are more nearly radial at the time when they are moving forward and upward, as shown at the left in Figs. 8 and 9. Said teeth therefore operate to rake up the hay from the ground and lift it so that it can easily be taken by the raker bar teeth and moved on up over the elevator frame, as will be apparent from an inspection of Fig. 1. After delivering the hay to the raker bar teeth, the disc teeth are folded back, as shown at the top in Figs. 8 and 9, so that they easily withdraw from the hay and do not interfere with its being carried up over the elevator frame.

The eccentrics 55 are held against rotation by stationary sleeves 56 carried by bars 57 secured to a transverse beam 58, which is connected to and supported by the brackets 37 by means of side bars 59, as shown in Figs. 1 and 4. The ends of the sleeves 56 are loosely fitted upon the adjoining ends of the sleeves 48, as shown in Fig. 6, and are notched to non-rotatably engage the correspondingly notched ends of the hubs 55$^a$ of said eccentrics, as shown in Figs. 6 and 7. As the sleeves 56 do not rotate the eccentrics are accordingly held stationary. The sleeves 56 also serve to space the pairs of discs apart, as the eccentrics abut against the flanges 49 of the sleeves 48, as shown in Fig. 6.

The operative height of the raker bar teeth above the deck of the elevator frame may be regulated by adjusting the position of the swinging links 18, 19. To this end said links are attached to vertically adjustable brackets 60 the position of which may be adjusted by cranks 61, as described in said Dain patent. By thus adjusting the raker bars, the relation of the teeth at the lower ends thereof to the disc teeth will also be varied so that the operation of the said members may be nicely regulated.

By the construction described the hay is much more effectively picked up than where the raker bars are relied upon to do that work, and danger of damaging the rake frames through violent contact of the lower ends of the raker bars with the ground is avoided. Also by controlling the angular position of the disc teeth the hay is properly delivered to the rake frames without the use of strippers, and practically none of it is left on the ground. The overlapping arrangement of the raker bar and disc teeth also contributes materially to that end.

What I claim as the invention of said Joseph Dain, deceased, is:—

1. A hay loader comprising an inclined elevator frame, hay elevating means operating thereover, means for adjusting said elevating means toward or away from said elevator frame, a rotary rake adjacent to the lower end of said elevator frame for delivering hay thereto, and separate driving connections for rotating said rake and actuating said hay elevating means.

2. A hay loader comprising a machine frame, an inclined elevator frame, hay elevating means operating thereover, a rotary rake adjacent to the lower end of said elevator frame for delivering hay thereto, a floating support connecting said rake with the machine frame, and separate driving connections for rotating said rake and actuating said hay elevating means.

3. A hay loader comprising a machine frame, carrying wheels therefor, an inclined elevator frame, hay elevating means operating thereover and actuated by the forward movement of the loader, a rotary rake adjacent to the lower end of said elevator frame for delivering hay thereto, means for rotating said rake, and a vertically-swinging support for said rake pivotally connected with the machine frame and having a bearing thereon at one side of its pivot.

4. A hay loader comprising a machine frame, carrying wheels therefor, an inclined elevator frame, hay elevating means operating thereover and actuated by the forward movement of the loader, a rotary rake adjacent to the lower end of said elevator frame for delivering hay thereto, means for rotating said rake, a vertically-swinging support for said rake pivotally connected with the machine frame and having a bearing thereon at one side of its pivot, and a spring which tends to swing said support upward.

5. A hay loader comprising a machine frame, an inclined elevator frame, hay elevating means operating thereover, a rotary rake adjacent to the lower end of said elevator frame for delivering hay thereto, vertically swinging frames pivotally supported by the machine frame below the elevator frame and connected with the end portions of said rake, and counter-balance springs connected with the machine frame and with said vertically swinging frames above the pivots thereof.

6. A hay loader comprising a machine frame, an inclined elevator frame, hay elevating means operating thereover, a rotary rake adjacent to the lower end of said elevator frame for delivering hay thereto, vertically swinging frames pivotally supported by the machine frame and connected with the end portions of said rake, counter-balance springs connected with the machine frame and with said vertically swinging frames, and adjustable bearing blocks carried by the latter frames and bearing on the machine frame for limiting the downward movement of said swinging frames.

7. A hay loader comprising a machine frame having front and rear wheels, an inclined elevator frame, hay elevating means operating over said elevator frame, a rotary rake adjacent to the lower end of said elevator frame for delivering hay thereto, and a floating support for said rake pivotally connected with the machine frame and having a bearing thereon at one side of its pivot.

8. A hay loader comprising a machine frame having front and rear wheels, an inclined elevator frame, hay elevating means operating thereover, a rotary rake adjacent to the lower end of said elevator frame for delivering hay thereto, vertically swinging frames pivotally supported by the machine frame and connected with the end portions of said rake, and counter-balance springs connected with the machine frame and with said vertically swinging frames.

9. A hay loader comprising an inclined elevator frame, reciprocating hay elevating devices operating over said frame, and a plurality of rotary rake tooth supporting devices mounted back of and adjacent to the lower end of said elevator frame, said supporting devices being spaced apart transversely of the machine, and the lower end portions of said elevating devices being arranged at the beginning of their operative stroke to overlap said supporting devices.

10. A hay loader comprising an inclined elevator frame, rake frames adapted to be reciprocated over said elevator frame, said rake frames being composed of a plurality of raker bars having rake teeth, means for moving said rake frames upward in close proximity to the elevator frame and downward at a distance therefrom, and a plurality of rotary rake tooth supporting devices mounted back of and adjacent to the lower end of said elevator frame, said supporting devices being spaced apart transversely of the machine and being arranged to be overlapped by the rake teeth at the lower end portions of said raker bars at the beginning of the operative strokes thereof.

11. A hay loader comprising an inclined elevator frame, rake frames adapted to be reciprocated over said elevator frame, said rake frames being composed of a plurality of raker bars having rake teeth, means for moving said rake frames upward in close proximity to the elevator frame and downward at a distance therefrom, means for adjusting said rake frames relatively to said elevator frame, and a plurality of rotary rake tooth supporting devices mounted back of and adjacent to the lower end of said elevator frame, said supporting devices being spaced apart transversely of the machine and being arranged to be overlapped by the rake teeth at the lower end portions of said raker bars at the beginning of the operative strokes thereof.

12. A hay loader comprising an inclined elevator frame, reciprocating hay elevating devices operating over said frame, and a plurality of rotary rake tooth supporting devices mounted adjacent to the lower end of said elevator frame, said supporting devices being spaced apart transversely of the machine, angularly adjustable rake teeth carried by said supporting devices and means controlled by the rotation of said supporting devices for angularly adjusting said rake teeth.

13. A hay loader comprising an inclined elevator frame, reciprocating hay elevating devices operating over said frame, and a plurality of rotary raking devices mounted adjacent to the lower end of said elevator frame, each of said raking devices being composed of a pair of separated discs, the several pairs being spaced apart transversely of the machine, and rake teeth mounted on said pairs of discs.

14. A hay loader comprising an inclined elevator frame, reciprocating hay elevating devices operating over said frame, and a plurality of rotary raking devices mounted adjacent to the lower end of said elevator frame, each of said raking devices being composed of a pair of separated discs, the several pairs being spaced apart transversely of the machine, rake teeth mounted on said pairs of discs, a shaft on which said discs are mounted, and means for rotating said shaft.

15. A hay loader comprising an inclined elevator frame, reciprocating hay elevating devices operating over said frame, and a plurality of rotary raking devices mounted adjacent to the lower end of said elevator frame, each of said raking devices being composed of a pair of separated discs, the several pairs being spaced apart transversely of the machine, angularly adjustable rake teeth carried by said raking devices and eccentric mechanism operated by the rotation of said discs for angularly adjusting said teeth.

16. A hay loader comprising an inclined elevator frame, reciprocating hay elevating devices operating over said frame, and a plurality of rotary raking devices mounted adjacent to the lower end of said elevator frame, each of said raking devices being composed of a pair of separated discs, the several pairs being spaced apart transversely of the machine, rocking rake teeth mounted between the discs of each pair and means controlled by the rotation of said discs for rocking said rake teeth.

17. A hay loader comprising an inclined elevator frame, reciprocating hay elevating devices operating over said frame, and a plurality of rotary raking devices mounted adjacent to the lower end of said elevator frame, each of said raking devices being composed of a pair of separated discs, the several pairs being spaced apart transversely of the machine, rocking rake teeth mounted between the discs of each pair and eccentric mechanism operated by the rotation of said discs for rocking said rake teeth.

18. A hay loader comprising an inclined elevator frame, reciprocating hay elevating devices operating over said frame, and a plurality of rotary raking devices mounted adjacent to the lower end of said elevator frame, each of said raking devices being composed of a pair of separated discs, the several pairs being spaced apart transversely of the machine, rocking rake teeth mounted between the discs of each pair and eccentric mechanism mounted between the discs of each pair and operated by the rotation of said discs for rocking said rake teeth.

19. A hay loader comprising an inclined elevator frame, reciprocating hay elevating devices operating over said frame, and a plurality of rotary raking devices mounted adjacent to the lower end of said elevator frame, each of said raking devices being composed of a pair of separated discs, the several pairs being spaced apart transversely of the machine, rocking rake teeth mounted between the discs of each pair, a shaft on which said discs are mounted, stationary eccentrics loosely mounted on said shaft between the discs of each pair and means operated by said eccentrics for rocking said rake teeth.

20. A hay loader comprising an inclined elevator frame, reciprocating hay elevating devices operating over said frame, and a plurality of rotary raking devices mounted adjacent to the lower end of said elevator frame, each of said raking devices being composed of a pair of separated discs, the several pairs being spaced apart transversely of the machine, rocking rake teeth mounted between the discs of each pair, a shaft on which said discs are mounted, eccentrics loosely mounted on said shaft between the discs of each pair, means for holding said eccentrics against rotation, and means operated by said eccentrics for rocking said rake teeth.

21. A hay loader comprising a machine frame, an inclined elevator frame, reciprocating hay elevating devices operating over said elevator frame, a plurality of rotary raking devices mounted on the machine frame adjacent to the lower end of said elevator frame, said raking devices being composed of pairs of separated discs, rake teeth pivotally mounted between the discs of each pair adjacent to the peripheries thereof, and means operated by the rotation of said discs for rocking said rake teeth.

22. A hay loader comprising a machine frame, an inclined elevator frame, reciprocating hay elevating devices operating over said elevator frame, a plurality of rotary raking devices mounted on the machine frame adjacent to the lower end of said elevator frame, said raking devices being composed of pairs of separated discs, rake teeth pivotally mounted between the discs of each pair adjacent to the peripheries thereof, eccentrics mounted between said discs, eccentric straps mounted on said eccentrics and operatively connected with said rake teeth, a shaft mounted on the machine frame and connected with said discs for rotating the same, and means mounted on the machine frame for holding said eccentrics stationary.

23. A hay loader comprising a machine frame, an inclined elevator frame, reciprocating hay elevating devices operating over said elevator frame, a plurality of rotary raking devices mounted on the machine frame adjacent to the lower end of said elevator frame, said raking devices being composed of pairs of separated discs, rake teeth pivotally mounted between the discs of each pair adjacent to the peripheries thereof, eccentrics mounted between said discs, eccentric straps mounted on said eccentrics and operatively connected with said rake teeth, a shaft mounted on the machine frame and connected with said discs for rotating the same, sleeves loosely mounted on said shaft between the pairs of discs and non-rotatably engaging said eccentrics, and means connecting said sleeves with the machine frame.

24. A hay loader comprising a machine frame having front and rear wheels, an elevator frame, hay elevating means operating over said elevator frame, a shaft mounted on the machine frame and extending transversely of the machine adjacent to the lower portion of said elevator frame, means driven by one of the front wheels for rotating said shaft, and a plurality of rake tooth supporting devices mounted in spaced relation to each other on said shaft and rotating therewith.

25. A hay loader comprising a machine frame having front and rear wheels, an elevator frame, hay elevating means operating over said elevator frame, a shaft mounted on the machine frame and extending transversely of the machine adjacent to the lower portion of said elevator frame, means driven by one of the front wheels for rotating said shaft, and a plurality of rake tooth supporting devices mounted in spaced relation to each other on said shaft and rotating therewith, each of said rake tooth supporting devices having a plurality of rocking rake teeth, and means operated by the rotation of said shaft for rocking said teeth.

26. A hay loader comprising a machine frame having front and rear wheels, an elevator frame, hay elevating means operating over said elevator frame, a shaft mounted on the machine frame and extending transversely of the machine adjacent to the lower portion of said elevator frame, means driven by one of the front wheels for rotating said shaft, a plurality of raking devices mounted in spaced relation to each other on said shaft and rotating therewith, each of said raking devices having a plurality of rocking rake teeth, eccentrics loosely mounted on said shaft, means connected with the rake teeth and operated by said eccentrics for rocking said teeth, and means connected with the machine frame for holding said eccentrics against rotation.

JOSEPH DAIN, Jr.,
*Administrator of Joseph Dain, Deceased.*